US012528556B2

(12) United States Patent
Tanaka et al.

(10) Patent No.: US 12,528,556 B2
(45) Date of Patent: Jan. 20, 2026

(54) VEHICLE

(71) Applicant: YAMAHA HATSUDOKI KABUSHIKI KAISHA, Iwata (JP)

(72) Inventors: Tatsuya Tanaka, Shizuoka (JP); Kensuke Kamada, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 840 days.

(21) Appl. No.: 17/851,078

(22) Filed: Jun. 28, 2022

(65) Prior Publication Data

US 2023/0136419 A1 May 4, 2023

(30) Foreign Application Priority Data

Nov. 4, 2021 (JP) .................................. 2021-180501

(51) Int. Cl.
*B62K 5/01* (2013.01)
*B62K 5/00* (2013.01)

(52) U.S. Cl.
CPC .......... *B62K 5/01* (2013.01); *B62K 2005/001* (2013.01)

(58) Field of Classification Search
CPC ...... B60G 2400/252; B60G 2400/0512; B60G 2200/144; B60G 2204/128; B60G 2204/129; B60G 2300/07; B60G 3/20; B60G 2800/91; B60G 2800/912; B60G 2800/914; B60G 2300/40; B62K 5/01; B62K 2005/001; B62K 25/24;

(Continued)

(56) References Cited

U.S. PATENT DOCUMENTS 3,351,037 A * 11/1967 Meili .................. B62D 53/005
180/41
3,504,934 A * 4/1970 Wallis .................... B62K 5/10
280/282

(Continued)

OTHER PUBLICATIONS

Tanaka, "Vehicle," U.S. Appl. No. 17/851,077, filed Jun. 28, 2022.

(Continued)

*Primary Examiner* — Timothy Wilhelm
(74) *Attorney, Agent, or Firm* — Keating & Bennett, LLP

(57) ABSTRACT

A vehicle includes a first suspension between a body and a front wheel, and a second suspension between the body and a rear wheel. An angle θ1 represents a ramp brake-over angle, and angles θ2, θ3, and θ4 respectively represent angles corresponding to the ramp brake-over angle when the first and the second suspension are fully stretched, fully compressed and fully stretched respectively, and fully stretched and fully compressed respectively. When a wheelbase is not smaller than about 1340 mm, the angle θ1 is not smaller than about 55 degrees, a value θ2/θ1 is not smaller than about 1.25, a value θ3/θ1 is not smaller than about 0.9, and a value θ4/θ1 is not smaller than about 0.8. When the wheelbase is not smaller than about 1340 mm and not greater than about 2000 mm, a wheel travel on the rear wheel side is not smaller than about 360 mm, a ratio of a stretch-side value to a compression-side value (stretch-side/compression-side) of the wheel travel on the rear wheel side is not smaller than about 0.5, and a value θ2/θ1 is not smaller than about 1.25.

11 Claims, 15 Drawing Sheets

(58) Field of Classification Search
CPC ........ B62K 25/26; B62K 25/286; B62K 5/00; B62K 25/04; B60W 2720/16
See application file for complete search history.

(56) References Cited

U.S. PATENT DOCUMENTS

| | | | | |
|---|---|---|---|---|
| 4,003,443 A * | 1/1977 | Boughers | B62K 5/10 180/361 |
| 4,433,747 A * | 2/1984 | Offenstadt | B62K 25/26 180/231 |
| 4,602,800 A * | 7/1986 | Persson | B60G 17/04 180/209 |
| 4,775,021 A * | 10/1988 | Marino | B62D 61/00 180/21 |
| 4,779,697 A * | 10/1988 | Takahashi | B62D 7/14 180/409 |
| 5,159,554 A * | 10/1992 | Buma | B60G 17/0155 280/5.513 |
| 5,655,615 A * | 8/1997 | Mick | B62D 49/0607 280/5.2 |
| 5,791,429 A * | 8/1998 | Bergman | B62M 27/02 180/9.5 |
| 6,112,843 A * | 9/2000 | Wilcox | B60K 17/36 180/209 |
| 6,311,795 B1 * | 11/2001 | Skotnikov | B60G 17/0152 280/6.154 |
| 6,374,171 B2 | 4/2002 | Weiberle | B60T 8/172 701/72 |
| 6,547,027 B1 * | 4/2003 | Kalhok | B62J 1/12 180/215 |
| 6,702,265 B1 * | 3/2004 | Zapletal | B60G 5/00 267/187 |
| 6,793,555 B1 * | 9/2004 | Tilbor | A63H 30/04 446/466 |
| 6,851,691 B2 * | 2/2005 | Rasidescu | B60G 3/14 280/124.135 |
| 7,004,484 B1 * | 2/2006 | Chevalier | B60G 3/20 280/124.136 |
| 7,357,404 B2 * | 4/2008 | Sommers | B60G 3/20 280/285 |
| 7,380,805 B1 * | 6/2008 | Turner | B60G 11/15 280/124.135 |
| 7,427,072 B2 * | 9/2008 | Brown | B60G 17/0157 280/5.52 |
| 7,513,516 B2 * | 4/2009 | Ryan | B60G 15/067 248/183.3 |
| 7,661,503 B2 * | 2/2010 | Weagle | B62K 25/286 280/286 |
| 7,783,402 B2 * | 8/2010 | Sawada | B60W 10/08 280/5.513 |
| 7,934,725 B2 * | 5/2011 | Brehob | B62D 61/12 280/5.514 |
| 8,050,820 B2 * | 11/2011 | Yanaka | B60W 40/11 180/41 |
| 8,371,589 B2 * | 2/2013 | Bartel | A61G 3/061 280/788 |
| 8,376,077 B2 * | 2/2013 | Venton-Walters | B60G 3/14 180/209 |
| 8,380,394 B1 * | 2/2013 | Snodgrass | B60G 17/018 701/37 |
| 8,517,395 B2 * | 8/2013 | Knox | B60G 17/0165 280/5.518 |
| 8,712,639 B2 * | 4/2014 | Lu | B60G 17/0195 701/91 |
| 8,740,232 B2 * | 6/2014 | Kunau | B60G 3/20 280/124.135 |
| 8,746,719 B2 * | 6/2014 | Safranski | B60K 17/348 280/124.152 |
| 8,827,028 B2 * | 9/2014 | Sunsdahl | B62D 21/183 |
| 8,887,842 B2 * | 11/2014 | Peck | B60G 11/16 180/24.03 |
| 8,894,088 B2 * | 11/2014 | Lark, Jr. | B62D 21/14 280/639 |
| 9,050,869 B1 * | 6/2015 | Pelzer | B60G 15/067 |
| 9,227,637 B2 * | 1/2016 | Nakatsu | B60W 10/08 |
| 9,260,153 B2 * | 2/2016 | Theobald | B62M 7/02 |
| 9,272,594 B2 * | 3/2016 | McLennan | B60G 17/0155 |
| 9,321,321 B2 * | 4/2016 | Koumura | B60G 17/0182 |
| 9,327,725 B2 * | 5/2016 | Anderfaas | B60W 10/20 |
| 9,352,678 B1 * | 5/2016 | Weldy | B60P 1/027 |
| 9,382,676 B2 * | 7/2016 | Berning | B62D 7/04 |
| 9,409,459 B2 * | 8/2016 | Solbrack | B60G 17/015 |
| 9,434,244 B2 * | 9/2016 | Sunsdahl | B62K 21/00 |
| 9,713,947 B2 * | 7/2017 | Irwin | B62D 35/005 |
| 9,849,883 B2 * | 12/2017 | Lu | B60W 50/10 |
| 9,956,842 B2 * | 5/2018 | Muir | E01C 23/088 |
| 10,160,497 B2 * | 12/2018 | Wimpfheimer | B60G 3/20 |
| 10,252,593 B2 * | 4/2019 | Fida | B60G 17/017 |
| 10,421,489 B2 * | 9/2019 | Held | B62D 11/20 |
| 10,442,475 B2 * | 10/2019 | Wagner | B60G 99/008 |
| 10,464,388 B2 * | 11/2019 | Kamiya | B60G 3/20 |
| 10,507,825 B2 * | 12/2019 | Gangwar | B60W 30/18109 |
| 11,046,143 B1 * | 6/2021 | Aikin | B60G 17/0195 |
| 11,110,913 B2 * | 9/2021 | Krosschell | B60W 30/04 |
| 11,117,636 B2 * | 9/2021 | Raffaelli | B62K 5/027 |
| 11,130,382 B2 * | 9/2021 | Nong | B60G 17/06 |
| 11,193,246 B2 * | 12/2021 | Schlenker | B60G 3/01 |
| 11,305,602 B2 * | 4/2022 | Du | B60G 17/01908 |
| 11,390,131 B2 * | 7/2022 | Fernandes | B62D 17/00 |
| 11,439,066 B2 * | 9/2022 | Addifetti | B60B 35/1054 |
| 11,472,246 B2 * | 10/2022 | Bosschieter | B60G 17/017 |
| 11,679,639 B2 * | 6/2023 | Rife, Jr. | B60G 17/0165 701/38 |
| 11,725,350 B2 * | 8/2023 | Stahl | G01C 21/12 299/1.5 |
| 11,865,887 B2 * | 1/2024 | Boon | B60G 17/0152 |
| 11,999,435 B2 * | 6/2024 | Michael | B62K 25/005 |
| 12,049,114 B2 * | 7/2024 | Damiani | B60G 17/0152 |
| 12,139,001 B1 * | 11/2024 | Wright | B60L 50/60 |
| 12,233,836 B2 * | 2/2025 | Yamamoto | B60T 8/245 |
| 2004/0134707 A1 * | 7/2004 | Rondeau | B62K 5/027 180/312 |
| 2004/0251651 A1 * | 12/2004 | Yamamoto | B60G 17/021 280/124.128 |
| 2009/0108663 A1 * | 4/2009 | Berning | E01C 23/088 299/1.5 |
| 2010/0222960 A1 * | 9/2010 | Oida | B60N 2/501 701/31.4 |
| 2013/0068550 A1 * | 3/2013 | Gale | B60G 3/14 280/5.509 |
| 2014/0049018 A1 | 2/2014 | Kunau | |
| 2017/0327148 A1 * | 11/2017 | Held | E21C 29/22 |
| 2019/0241037 A1 * | 8/2019 | Hays | B60B 19/00 |
| 2020/0231016 A1 * | 7/2020 | Vente | B60G 17/0165 |
| 2020/0282793 A1 * | 9/2020 | Fernandes | B60G 17/052 |
| 2021/0206446 A1 * | 7/2021 | Araki | B60G 3/20 |
| 2021/0283969 A1 * | 9/2021 | Danielson | B60G 17/0165 |
| 2021/0370739 A1 * | 12/2021 | Seo | B60G 17/0161 |
| 2021/0394575 A1 * | 12/2021 | Nong | B60G 17/0162 |
| 2022/0144034 A1 * | 5/2022 | Kim | H02K 7/102 |
| 2022/0219503 A1 * | 7/2022 | Niessing | B60G 21/051 |
| 2022/0234412 A1 * | 7/2022 | Tonkovich | B60G 21/106 |
| 2023/0271469 A1 * | 8/2023 | Birch | B60G 17/016 701/23 |
| 2023/0294473 A1 * | 9/2023 | Ali | B60G 17/0161 701/37 |
| 2024/0017729 A1 * | 1/2024 | Wang | B60W 40/107 |
| 2024/0059118 A1 * | 2/2024 | Ali | B60G 17/0195 |
| 2024/0075783 A1 * | 3/2024 | Shimoya | B60G 17/0162 |
| 2024/0208289 A1 * | 6/2024 | Zhang | B60G 17/016 |

OTHER PUBLICATIONS

Tanaka, "Straddled Vehicle," U.S. Appl. No. 17/851,080, filed Jun. 28, 2022.

* cited by examiner

FIG. 9

| | | Present invention | | Conventional examples | | | | | |
|---|---|---|---|---|---|---|---|---|---|
| | | Unity ATV | | Unity ATV | | Sport ATV | ROV | | |
| | | Embodiment 1 | Embodiment 2 | Comparative example 1 | Comparative example 2 | Comparative example 3 | Comparative example 4 | Comparative example 5 | Comparative example 6 |
| Wheelbase | mm | 1574.0 | 1524.0 | 1250.0 | 1498.6 | 1442.7 | 1270.0 | 2300.0 | 2290.0 |
| Minimum ground clearance | mm | 364.0 | 338.6 | 287.0 | 330.2 | 368.3 | 235.0 | 335.0 | 340.0 |
| Tire size(Outer diameter) | inch | 32.0 | 30.0 | 27.0 | 30.0 | 27.0 | F21, R20 | 29.0 | 29.0 |
| Front wheel travel | mm | 304.8 | 304.8 | 197.2 | 253.9 | 294.6 | 250.0 | 412.7 | 361.1 |
| Compressed | mm | 177.8 | 177.8 | 164.6 | 202.1 | 235.6 | 145.0 | 318.0 | 254.2 |
| Stretched | mm | 127.0 | 127.0 | 32.6 | 51.8 | 59.0 | 105.0 | 94.7 | 106.9 |
| Stretch/Compress | | 0.714 | 0.714 | 0.198 | 0.256 | 0.250 | 0.724 | 0.298 | 0.421 |
| Rear wheel travel | mm | 381.0 | 381.0 | 231.6 | 266.8 | 355.6 | 278.0 | 432.0 | 337.8 |
| Compressed | mm | 228.6 | 228.6 | 167.0 | 185.7 | 282.6 | 212.0 | 308.6 | 149.0 |
| Stretched | mm | 152.4 | 152.4 | 64.6 | 81.1 | 73.0 | 66.0 | 123.7 | 188.8 |
| Stretch/Compress | | 0.667 | 0.667 | 0.387 | 0.437 | 0.258 | 0.311 | 0.403 | 1.267 |
| θ1 | deg | 58.9 | 56.6 | 59.8 | 56.4 | 63.8 | 47.4 | 36.0 | 36.7 |
| θ2 | deg | 77.8 | 76.1 | 68.7 | 66.3 | 73.4 | 61.6 | 46.4 | 50.9 |
| θ3 | deg | 56.1 | 53.7 | 49.9 | 46.4 | 50.1 | 41.6 | 26.0 | 33.0 |
| θ4 | deg | 49.6 | 47.1 | 46.3 | 43.7 | 44.8 | 36.1 | 24.7 | 34.2 |
| θ2/θ1 | | 1.32 | 1.34 | 1.15 | 1.18 | 1.15 | 1.30 | 1.29 | 1.39 |
| θ3/θ1 | | 0.95 | 0.95 | 0.83 | 0.82 | 0.79 | 0.88 | 0.72 | 0.90 |
| θ4/θ1 | | 0.84 | 0.83 | 0.77 | 0.77 | 0.70 | 0.76 | 0.69 | 0.93 |

VEHICLE

CROSS REFERENCE TO RELATED APPLICATIONS

This application claims the benefit of priority to Japanese Patent Application No. 2021-180501 filed on Nov. 4, 2021. The entire contents of this application are hereby incorporated herein by reference.

BACKGROUND OF THE INVENTION

1. Field of the Invention

The present invention relates to vehicles, and more specifically to four-wheel off-road vehicles and the like.

2. Description of the Related Art

As an example of conventional techniques of this kind, U.S. Patent Application Publication No. 2004/0134707 discloses a four-wheel off-road vehicle. The four-wheel off-road vehicle, which has a frame and four wheels supported by the frame, has a long wheelbase ranging from 52 to 72 inches.

U.S. Patent Application Publication No. 2004/0134707 does not disclose anything about wheel travel (rebound stroke) nor ramp brake-over angle.

SUMMARY OF THE INVENTION

According to a preferred embodiment of the present invention, a vehicle includes a body; a front wheel and a rear wheel; a first suspension between the body and the front wheel; and a second suspension between the body and the rear wheel, wherein, when an angle $\theta 1$ represents a ramp brake-over angle, an angle $\theta 2$ represents an angle in an up-down direction defined by a tangential line extending through a bottom portion of the body at a center of a wheelbase to the front wheel and a tangential line extending through the bottom portion of the body at the center of the wheelbase to the rear wheel when the first suspension and the second suspension are fully stretched, and the wheelbase is not smaller than about 1340 mm: the angle $\theta 1$ is not smaller than about 55 degrees, and a ratio of the angle $\theta 2$ to the angle $\theta 1$ ($\theta 2/\theta 1$) is not smaller than about 1.25.

According to another preferred embodiment of the present invention, a vehicle includes a body; a front wheel and a rear wheel; a first suspension between the body and the front wheel; and a second suspension between the body and the rear wheel; wherein, when an angle $\theta 1$ represents a ramp brake-over angle, an angle $\theta 3$ represents an angle in an up-down direction defined by a tangential line extending through a bottom portion of the body at a center of a wheelbase to the front wheel and a tangential line extending through the bottom portion of the body at the center of the wheelbase to the rear wheel when the first suspension is fully compressed and the second suspension is fully stretched, and the wheelbase is not smaller than about 1340 mm: the angle $\theta 1$ is not smaller than about 55 degrees, and a ratio of the angle $\theta 3$ to the angle $\theta 1$ ($\theta 3/\theta 1$) is not smaller than about 0.9.

According to another preferred embodiment of the present invention, a vehicle includes a body; a front wheel and a rear wheel; a first suspension between the body and the front wheel; and a second suspension between the body and the rear wheel; wherein, when an angle $\theta 1$ represents a ramp brake-over angle, an angle $\theta 4$ represents an angle in an up-down direction defined by a tangential line extending through a bottom portion of the body at a center of a wheelbase to the front wheel and a tangential line extending through the bottom portion of the body at the center of the wheelbase to the rear wheel when the first suspension is fully stretched and the second suspension is fully compressed, and the wheelbase is not smaller than about 1340 mm: the angle $\theta 1$ is not smaller than about 55 degrees, and a ratio of the angle $\theta 4$ to the angle $\theta 1$ ($\theta 4/\theta 1$) is not smaller than about 0.8.

According to another preferred embodiment of the present invention, a vehicle includes a body; a front wheel and a rear wheel; a first suspension between the body and the front wheel; and a second suspension between the body and the rear wheel; wherein, when the vehicle has a wheelbase not smaller than about 1340 mm and not greater than about 2000 mm: a wheel travel on a rear wheel side is not smaller than about 360 mm.

According to another preferred embodiment of the present invention, a vehicle includes a body; a front wheel and a rear wheel; a first suspension between the body and the front wheel; and a second suspension between the body and the rear wheel; wherein, when the vehicle has a wheelbase not smaller than about 1340 mm and not greater than about 2000 mm: a wheel travel ratio of a stretch-side to a compression-side (stretch-side/compression-side) on a rear wheel side is not smaller than about 0.5.

Preferably, the vehicle has a wheel travel ratio of a stretch-side to a compression-side (stretch-side/compression-side) on the front wheel side not smaller than about 0.5.

According to another preferred embodiment of the present invention, a vehicle includes a body; a front wheel and a rear wheel; a first suspension between the body and the front wheel; and a second suspension between the body and the rear wheel; wherein, when an angle $\theta 1$ represents a ramp brake-over angle, an angle $\theta 2$ represents an angle in an up-down direction defined by a tangential line extending through a bottom portion of the body at a center of a wheelbase to the front wheel and a tangential line extending through the bottom portion of the body at the center of the wheelbase to the rear wheel when the first suspension and the second suspension are fully stretched, and the wheelbase is not smaller than about 1340 mm and not greater than about 2000 mm: a ratio of the angle $\theta 2$ to the angle $\theta 1$ ($\theta 2/\theta 1$) is not smaller than about 1.25.

Preferably, the vehicle further includes a bar handle provided on the body.

Further preferably, the vehicle further includes a saddle-type seat provided on the body.

Further, preferably, the vehicle includes at least one of the front wheel and the rear wheel including a plurality thereof.

Preferably, the vehicle has a minimum ground clearance not smaller than about 275 mm.

For example, when the vehicle is traveling on a steep slope or over a large bump, there is a load shift toward the rear wheel side during uphill travel so that the rear wheel side second suspension sinks and the front wheel side first suspension stretches. During downhill travel, on the other hand, there is a load shift toward the front wheel side so that the front wheel side first suspension sinks and the rear wheel side second suspension stretches. In a preferred embodiment of the present invention, even if the vehicle has a long wheelbase, the ramp brake-over angle is made greater such that the minimum ground clearance is increased accordingly and there is less likelihood for the bottom of the vehicle to contact the ground. Also, increasing the wheel travel offers the same advantage. Preferred embodiments of the present invention provide vehicles each having a reduced likelihood of the bottom of the vehicle contacting the ground even if the vehicle has a long wheelbase.

It should be noted here that the term "ramp brake-over angle θ1" refers to a ramp brake-over angle when the vehicle in an unmanned state is oriented horizontally.

Each of the angles θ2, θ3, and θ4 is an angle corresponding to the ramp brake-over angle θ1. In other words, all of the angles θ2, θ3, and θ4 are defined in the same way as the ramp brake-over angle θ1, i.e., an angle in an up-down direction defined by a tangential line extending through a bottom portion of the body at the center of a wheelbase to the front wheel and a tangential line extending through the bottom portion of the body at the center of the wheelbase to the rear wheel when the vehicle in an unmanned state is oriented horizontally.

All of the ramp brake-over angle θ1 and the angles θ2 through θ4 are measured in a side view.

While it is possible to draw a tangential line through the bottom portion of the body at the center of the wheelbase to the front wheel, to whichever of an upper side and a lower side of the front wheel, the tangential line in preferred embodiments of the present invention is the tangential line extending to the lower side of the front wheel. The same applies to the tangential line extending to the rear wheel.

The term "wheelbase" is a distance between a front wheel axle and a rear wheel axle.

The term "bottom portion of the body at the center of the wheelbase" refers to a point where a bottom portion of the body is crossed by a plane which passes through the center of a fore-aft distance of the wheelbase vertically to the fore-aft direction.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 9 is a table which shows various dimensions and so on, according to preferred embodiments of the present invention and conventional examples.

DETAILED DESCRIPTION OF THE PREFERRED EMBODIMENTS

Hereinafter, preferred embodiments of the present invention will be described with reference to the drawings.

Figure 1:
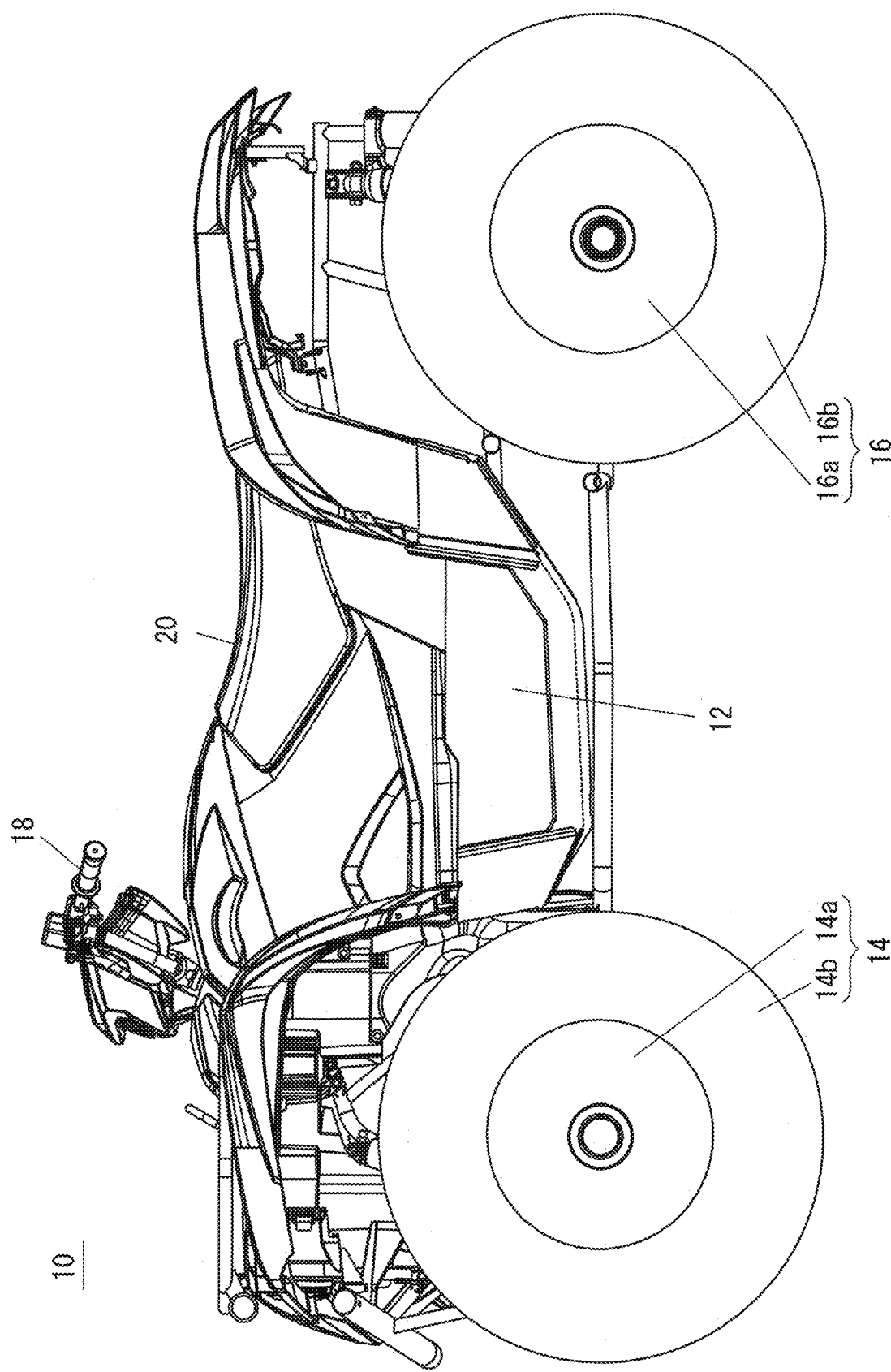
FIG. 1 is a side view which shows a vehicle according to a preferred embodiment of the present invention.
Figure 2:
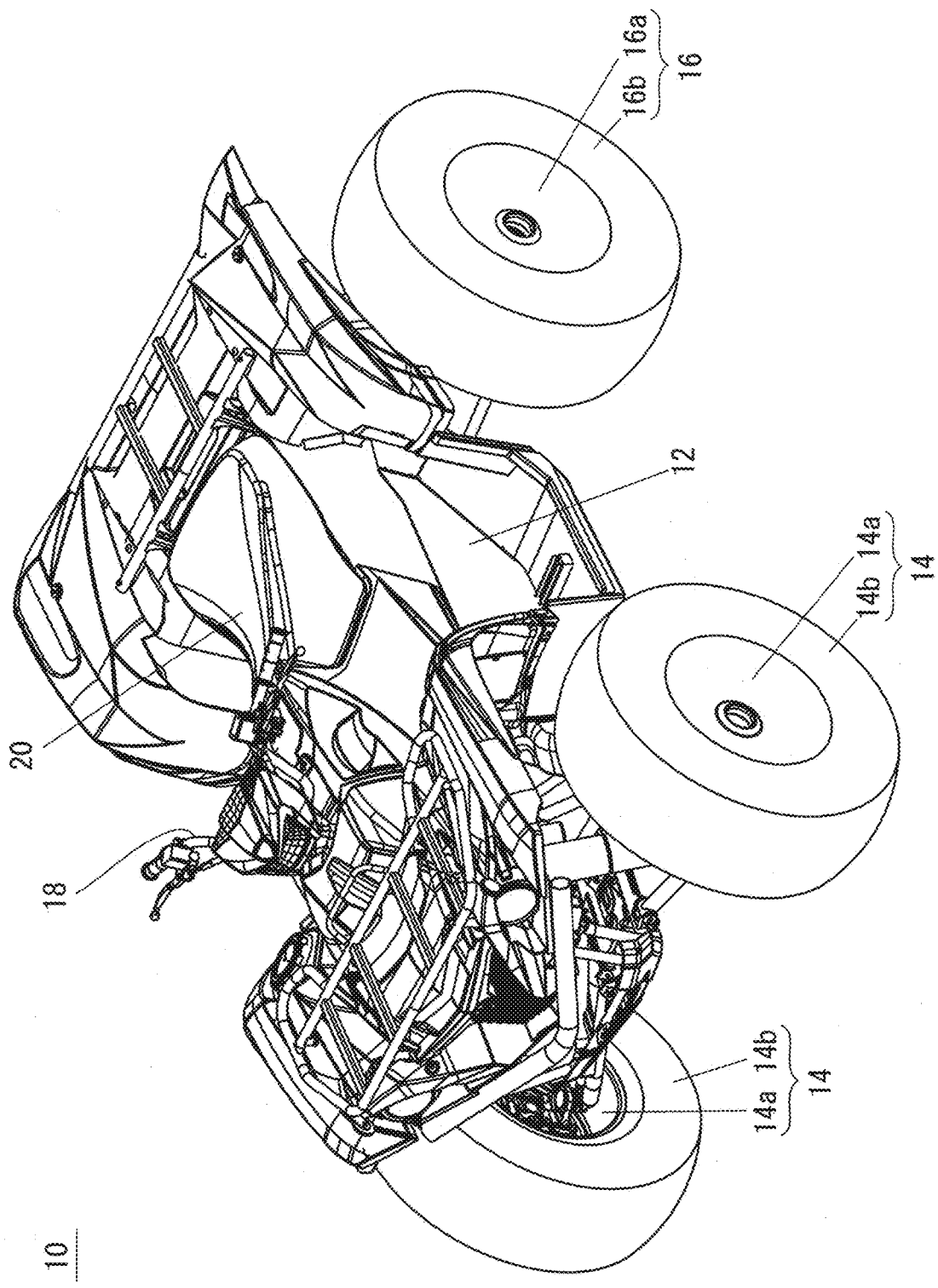
FIG. 2 is a perspective view which shows the vehicle in FIG. 1.

Referring to FIG. 1 and FIG. 2, a vehicle 10 according to a preferred embodiment of the present invention is a four-wheel off-road vehicle, which includes a body 12, a pair of front wheels 14, a pair of rear wheels 16, a bar handle 18 provided on the body 12, and a saddle-style seat 20 provided on the body 12. Note that FIG. 2 shows only one of the pair of rear wheels 16. The bar handle 18 is provided between the pair of front wheels 14 in a plan view, at an intermediate portion in the vehicle's width direction, and in a side view, above the front wheels 14. The saddle-style seat 20 is provided at an intermediate portion in the vehicle's width direction, and in a side view, at a higher position than the front wheels 14 and the rear wheels 16, between the front wheels 14 and the rear wheels 16.

Each front wheel 14 includes a wheel 14a and a front tire 14b attached to the wheel 14a. Likewise, each rear wheel 16 includes a wheel 16a and a rear tire 16b attached to the wheel 16a.

Figure 3:
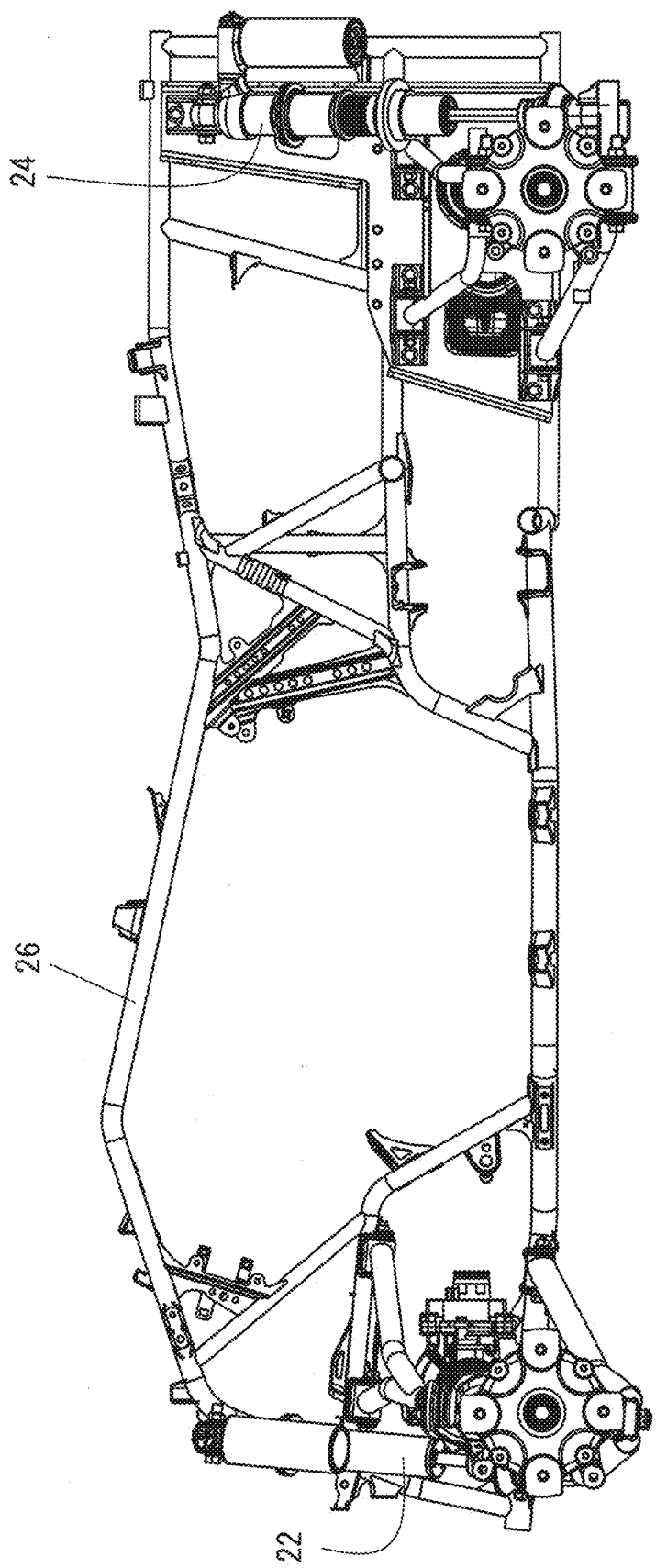
FIG. 3 is a side view which shows a first suspension, a second suspension and so on included in the vehicle in FIG. 1.
Figure 4:
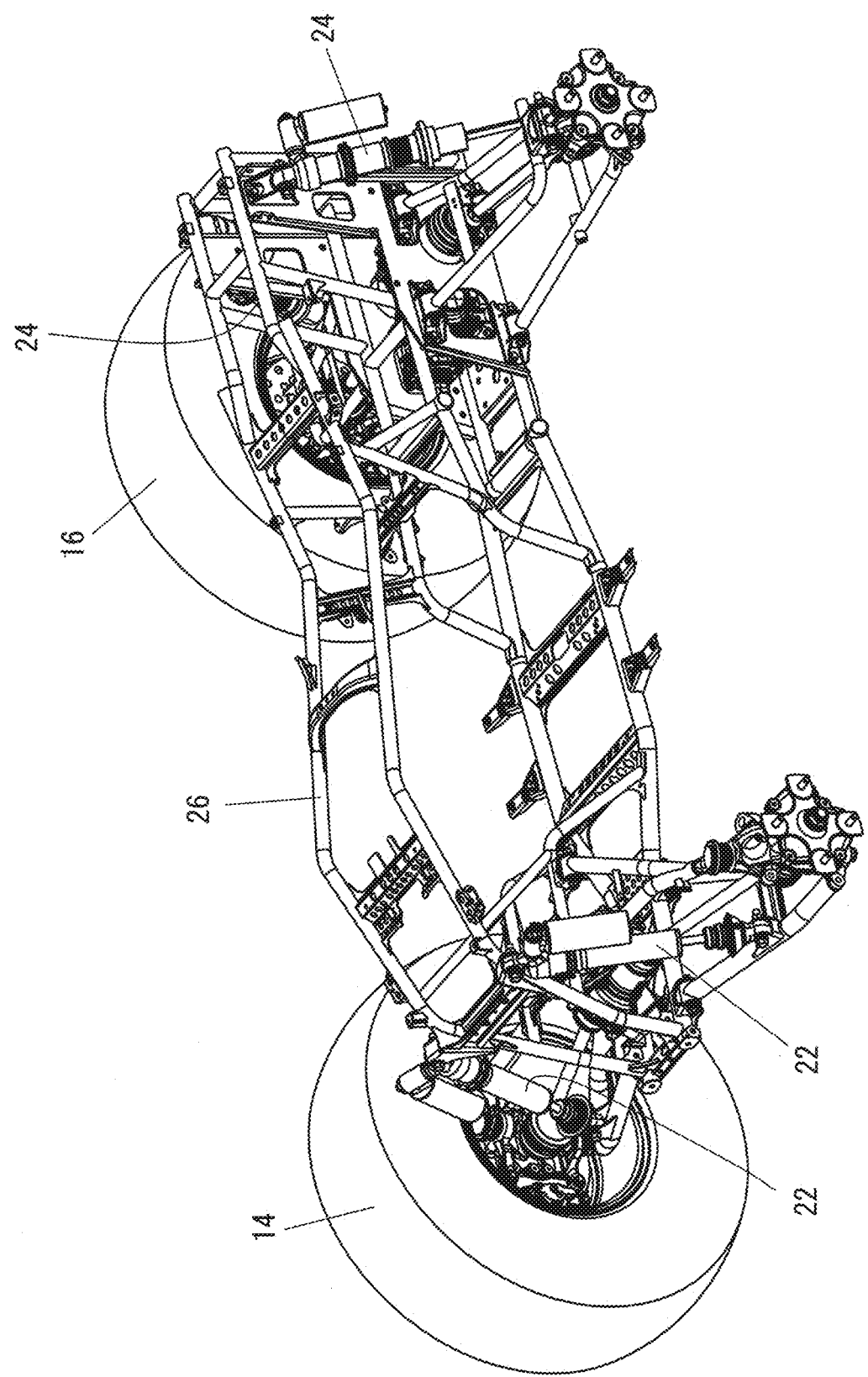
FIG. 4 is a perspective view which shows the first suspension, the second suspension and so on included in the vehicle in FIG. 1.

Referring also to FIG. 3 and FIG. 4, the vehicle 10 further includes a pair of first suspensions 22 and a pair of second suspensions 24. The body 12 includes a body frame 26. The pair of first suspensions 22 are provided between the pair of front wheels 14 and the body frame 26 in order to suspend the pair of front wheels 14. The pair of second suspensions 24 are provided between the pair of rear wheels 16 and the body frame 26 in order to suspend the pair of rear wheels 16. In other words, each first suspension 22 is provided between the body 12 and a corresponding one of the front wheels 14 while each second suspension 24 is provided between the body 12 and a corresponding one of the rear wheels 16. It should be noted here that hereinafter, the expression "normal state" refers to a state in which there is no rider in the vehicle 10.

Figure 5A:
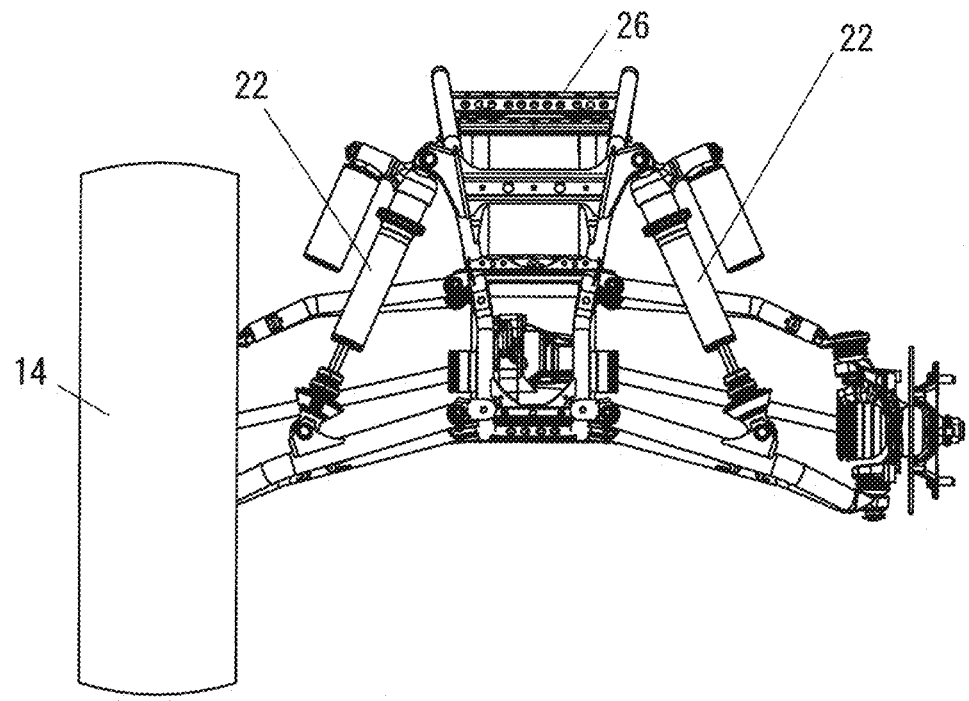
FIG. 5A is a front view which shows the first suspension in normal state.
Figure 5B:
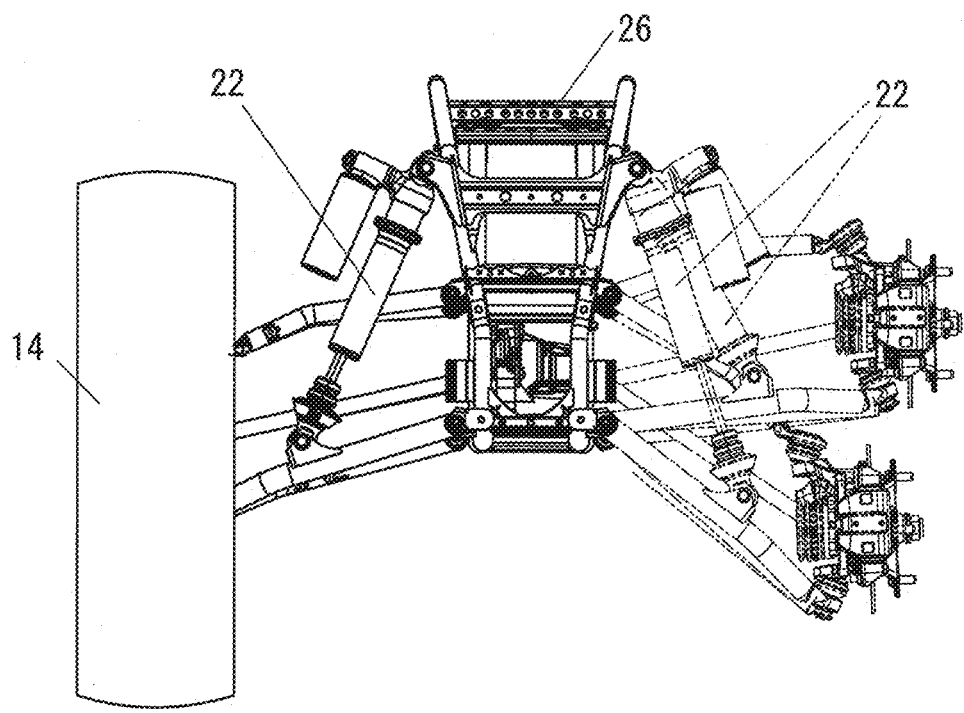
FIG. 5B is a front view which shows the first suspension when fully stretched and when fully compressed.
Figure 6A:
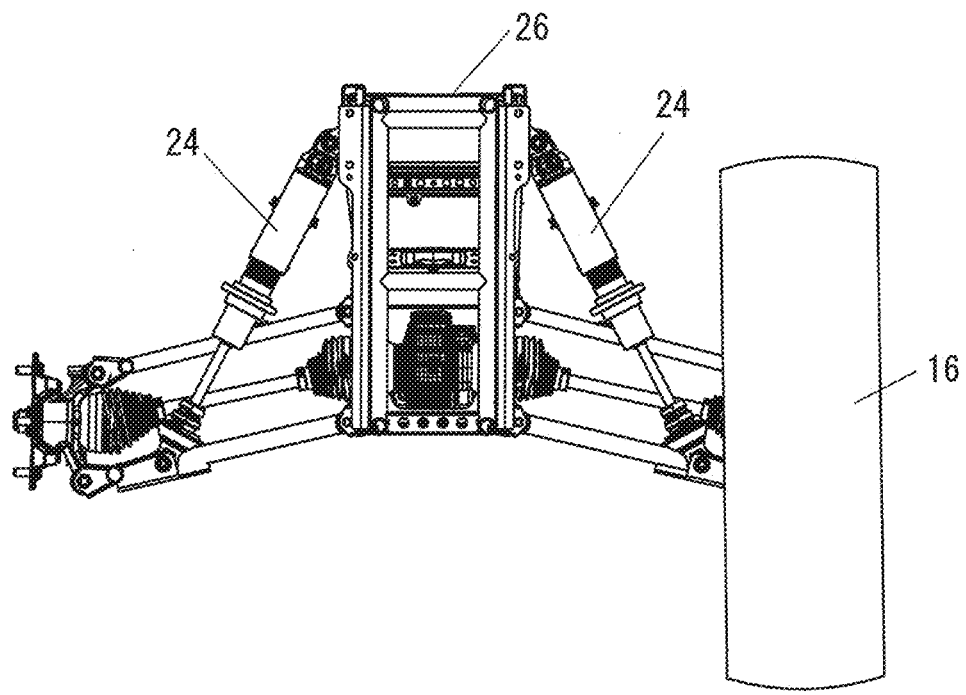
FIG. 6A is a rear view which shows the second suspension in normal state.
Figure 6B:
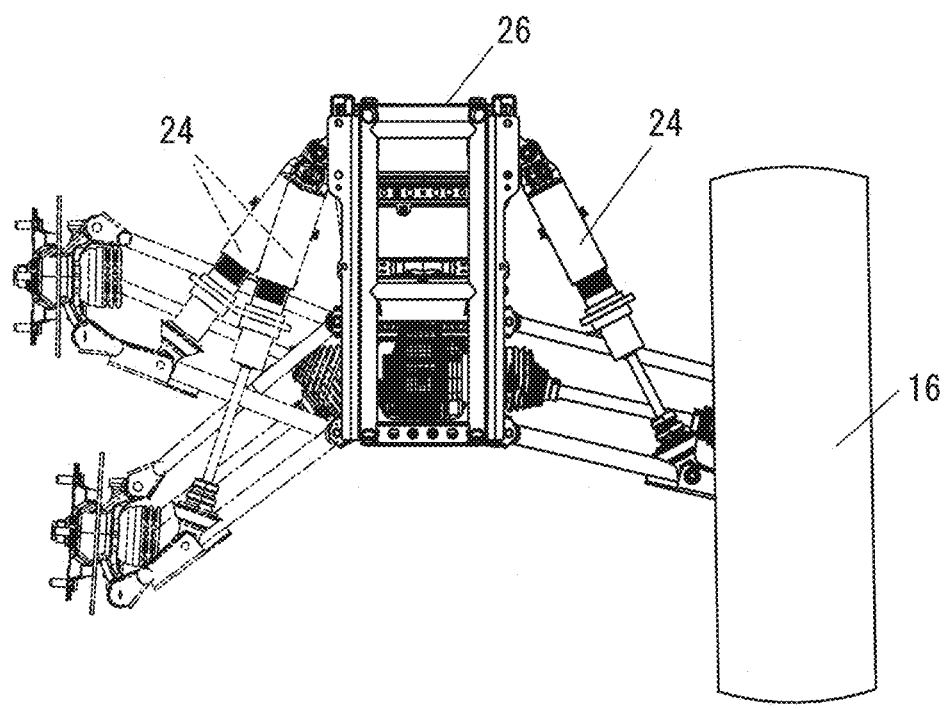
FIG. 6B is a rear view which shows the second suspension when fully stretched and when fully compressed.

In the normal state, the first suspension 22 is in a state as shown in FIG. 5A, and when fully stretched and when fully compressed, is in respective states as shown in alternate long and two short dashes lines in FIG. 5B. In the normal state, the second suspension 24 is in a state as shown in FIG. 6A, and when fully stretched and when fully compressed, is in respective states as shown in alternate long and two short dashes lines in FIG. 6B.

Figure 7:
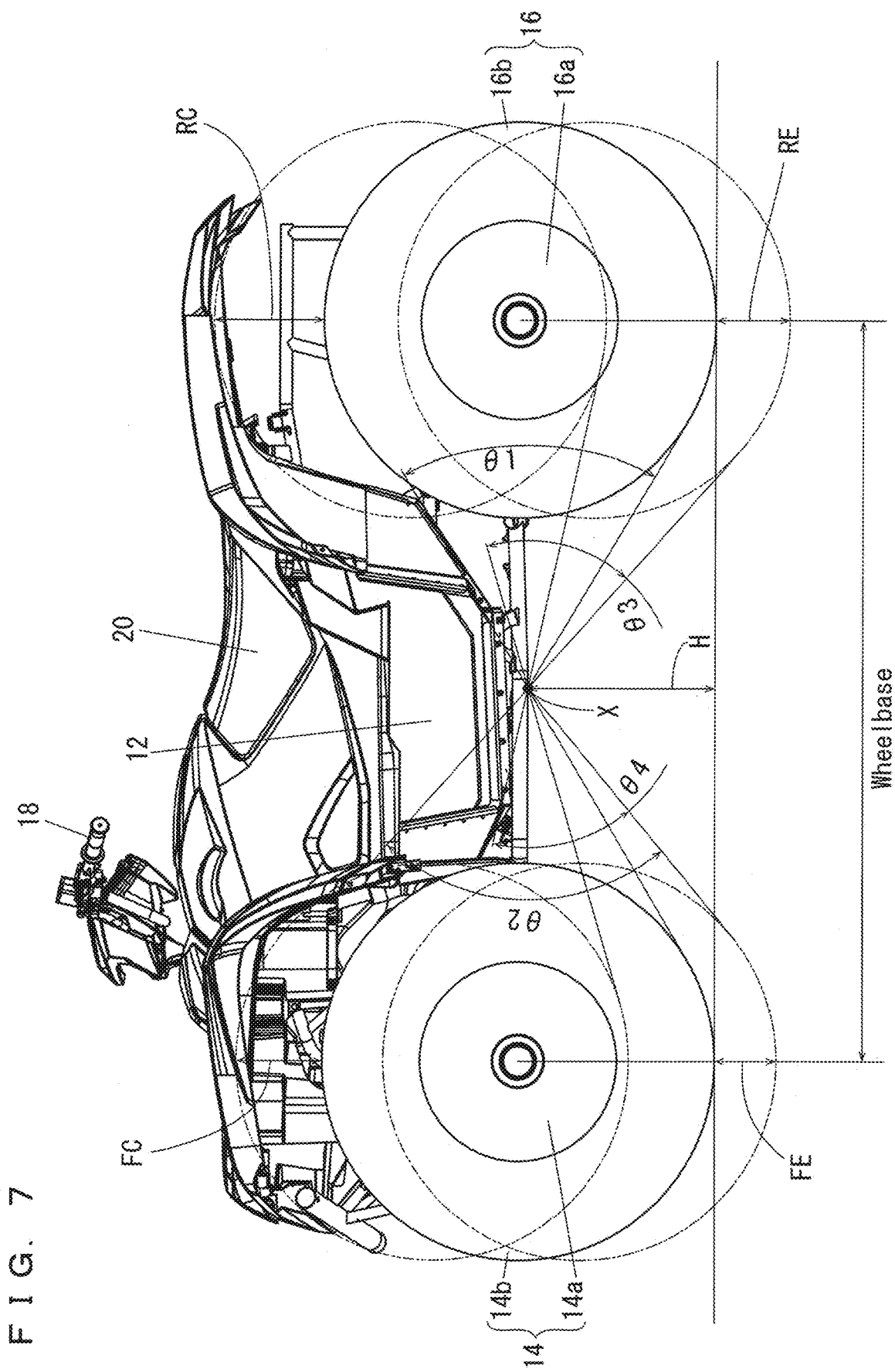
FIG. 7 is an illustrative drawing which shows a ramp brake-over angle, a wheelbase, a wheel travel, etc.
Figure 8B:
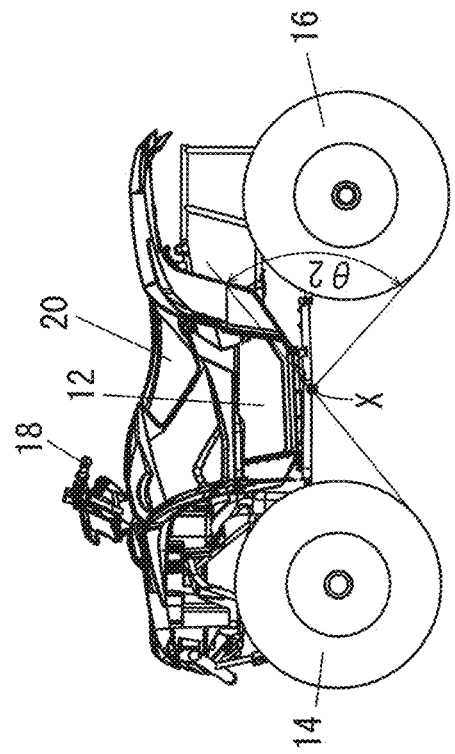
FIG. 8B shows an angle θ2.
Figure 8D:
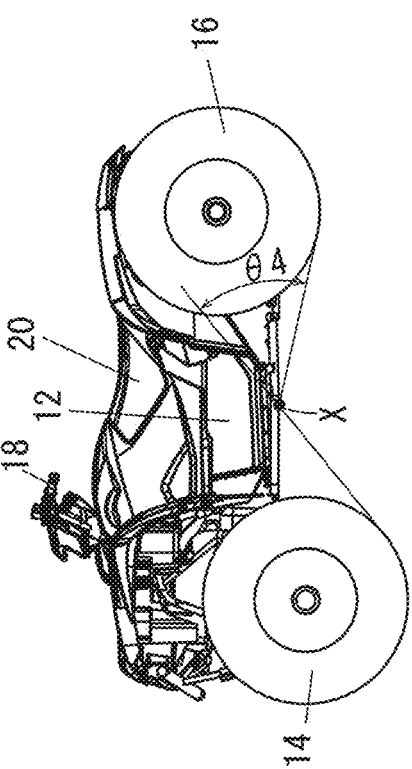
FIG. 8D shows an angle θ4.
Figure 8A:
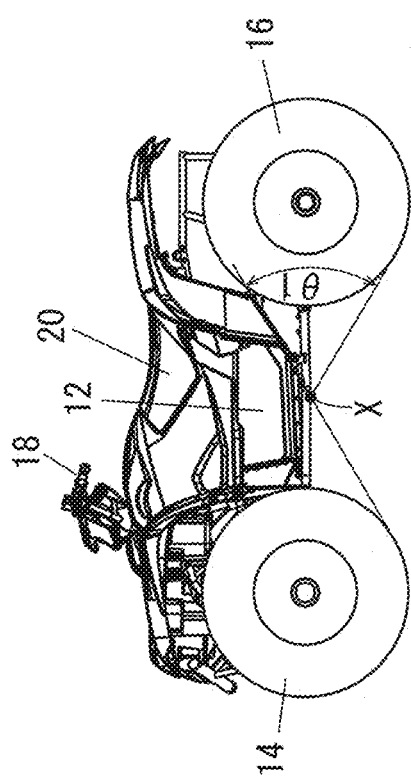
FIG. 8A is an illustrative drawing which shows a ramp brake-over angle θ1. Likewise.
Figure 8C:
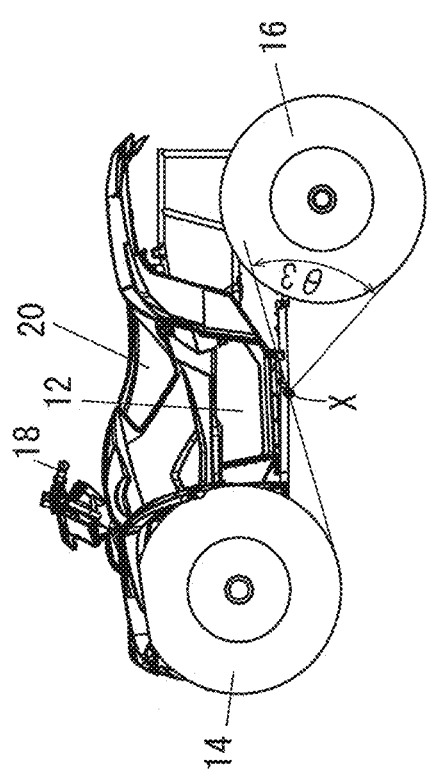
FIG. 8C shows an angle θ3.

Referring to FIG. 7 and FIGS. 8A to 8D, an angle θ1 (FIG. 8A) is a ramp brake-over angle, i.e., an angle in the up-down direction defined by a tangential line extending through the body's bottom portion X at the center of a wheelbase to the front wheel 14 and a tangential line extending through the body's bottom portion X at the center of the wheelbase to the rear wheel 16 when the vehicle 10 in an unmanned state is oriented horizontally; an angle θ2 (FIG. 8B) is an angle in the up-down direction defined by a tangential line extending through the body's bottom portion X at the center of the wheelbase to the front wheel 14 and a tangential line extending through the body's bottom portion X at the center of the wheelbase to the rear wheel 16 when the first suspension 22 and the second suspension 24 are fully stretched; an angle θ3 (FIG. 8C) is an angle in the up-down direction defined by a tangential line extending through the body's bottom portion X at the center of the wheelbase to the front wheel 14 and a tangential line extending through the body's bottom portion X at the center of the wheelbase to the rear wheel 16 when the first suspension 22 is fully compressed and the second suspension 24 is fully stretched; and θ4 (FIG. 8D) is an angle in the up-down direction defined by a tangential line extending through the body's bottom portion X at the center of the wheelbase to the front wheel 14 and a tangential line extending through the body's bottom portion X at the center of the wheelbase to the rear wheel 16 when the first suspension 22 is fully stretched and the second suspension 24 is fully compressed. Referring also to FIG. 7, a wheel travel of the front wheel 14 on a stretch-side will be called FE; a wheel travel of the front wheel 14 on a compression-side will be called FC; a wheel travel of the rear wheel 16 on a stretch-side will be called RE; a wheel travel of the rear wheel 16 on a compression-side will be called RC; and a minimum ground clearance will be called H. It should be noted here that the ramp brake-over angle θ1 and the angles θ2 through θ4 are calculated by ignoring tire deflections and using nominal tire sizes.

Figure 10:
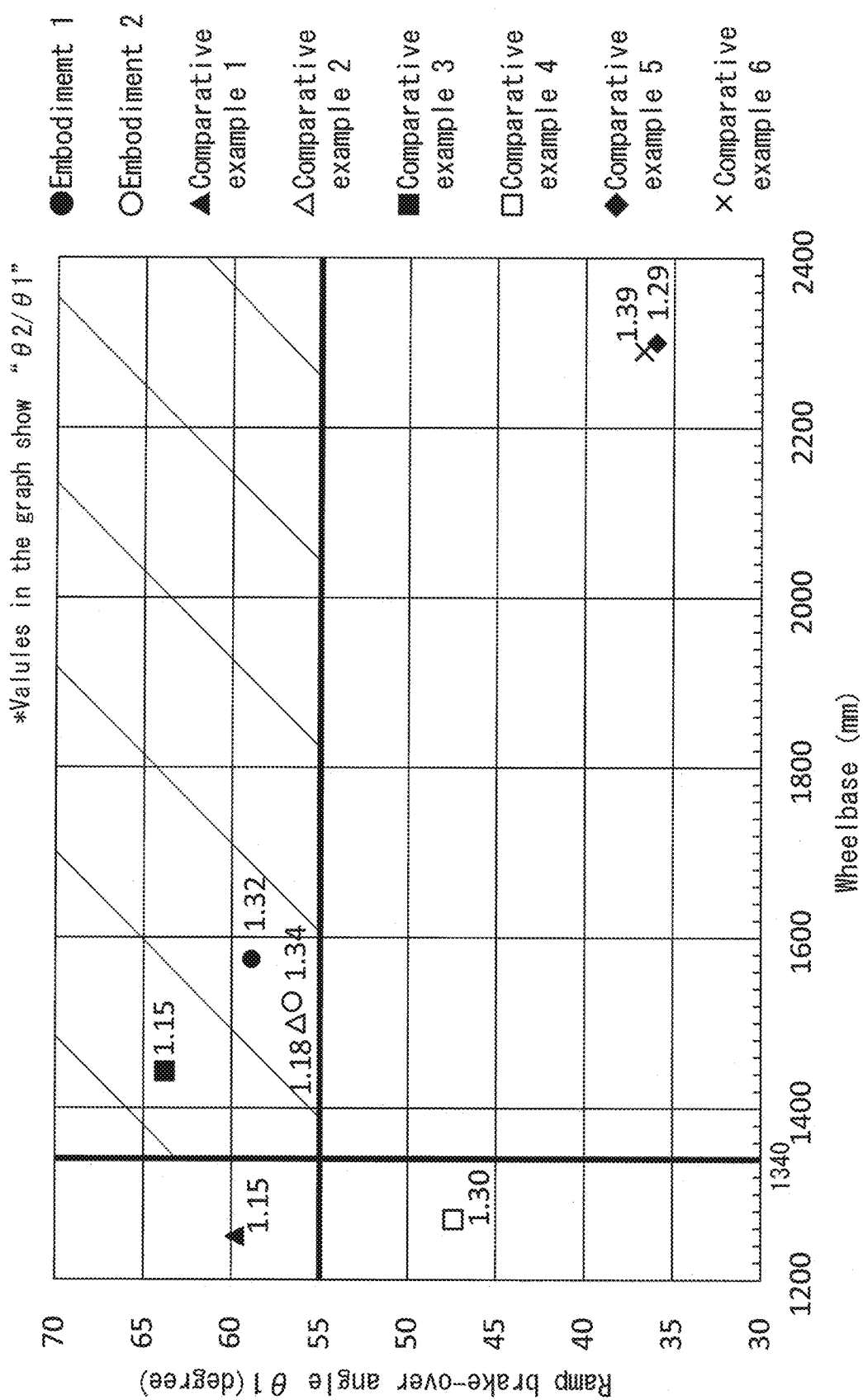
FIG. 10 is a graph which shows the wheelbase, the ramp brake-over angle θ1, and θ2/θ1 according to preferred embodiments of the present invention and comparative examples.

Referring to FIG. 9 and FIG. 10, preferably, the wheelbase of the vehicle 10 is not smaller than about 1340 mm, the angle θ1 is not smaller than about 55 degrees, and a ratio of the angle θ2 to the angle θ1 (θ2/θ1) is not smaller than about 1.25.

Figure 11:
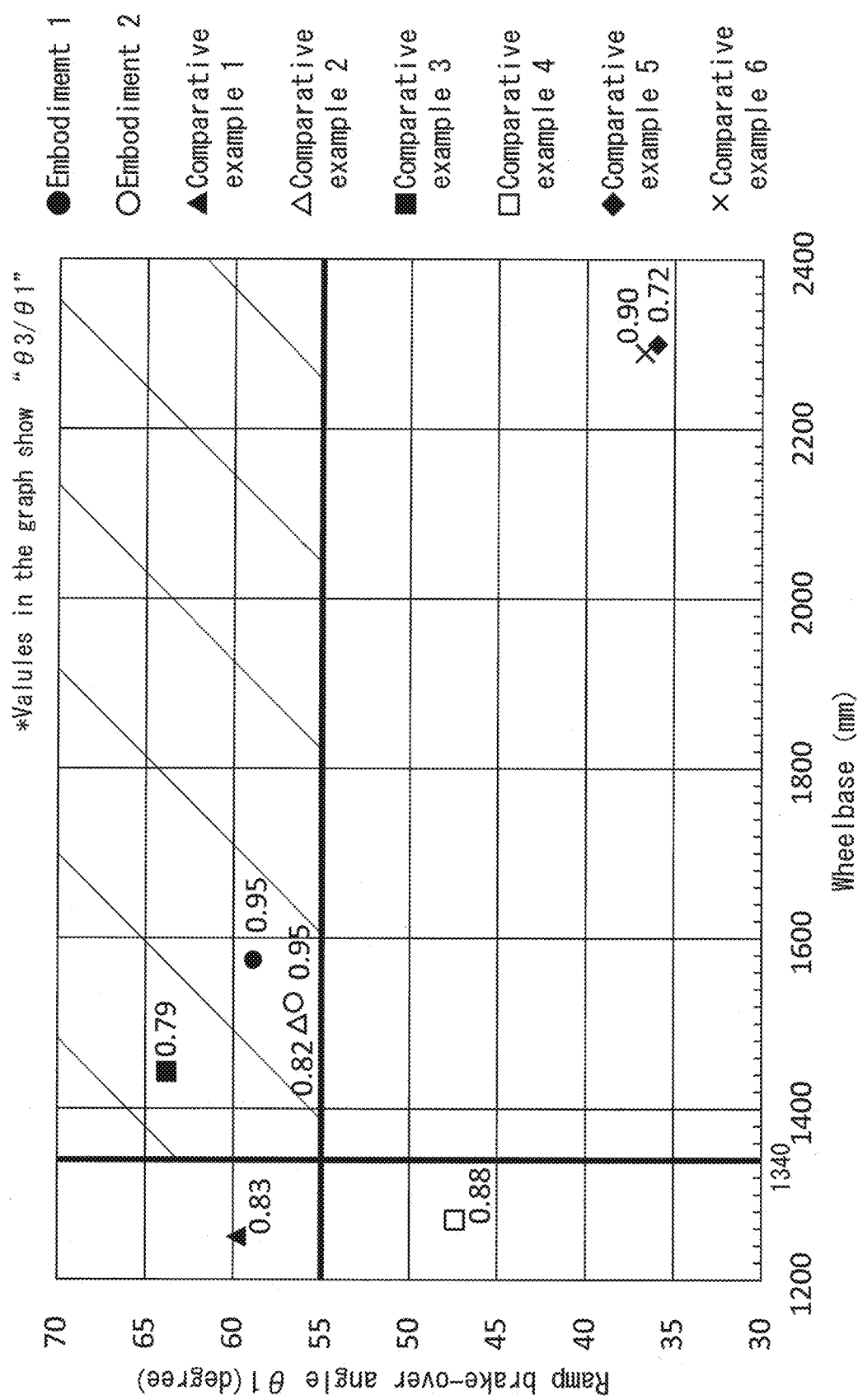
FIG. 11 is a graph which shows the wheelbase, the ramp brake-over angle θ1, and θ3/θ1 according to preferred embodiments of the present invention and comparative examples.

Referring to FIG. 9 and FIG. 11, preferably, the wheelbase of the vehicle 10 is not smaller than about 1340 mm, the angle θ1 is not smaller than about 55 degrees, and a ratio of the angle θ3 to the angle θ1 (θ3/θ1) is not smaller than about 0.9.

Figure 12:
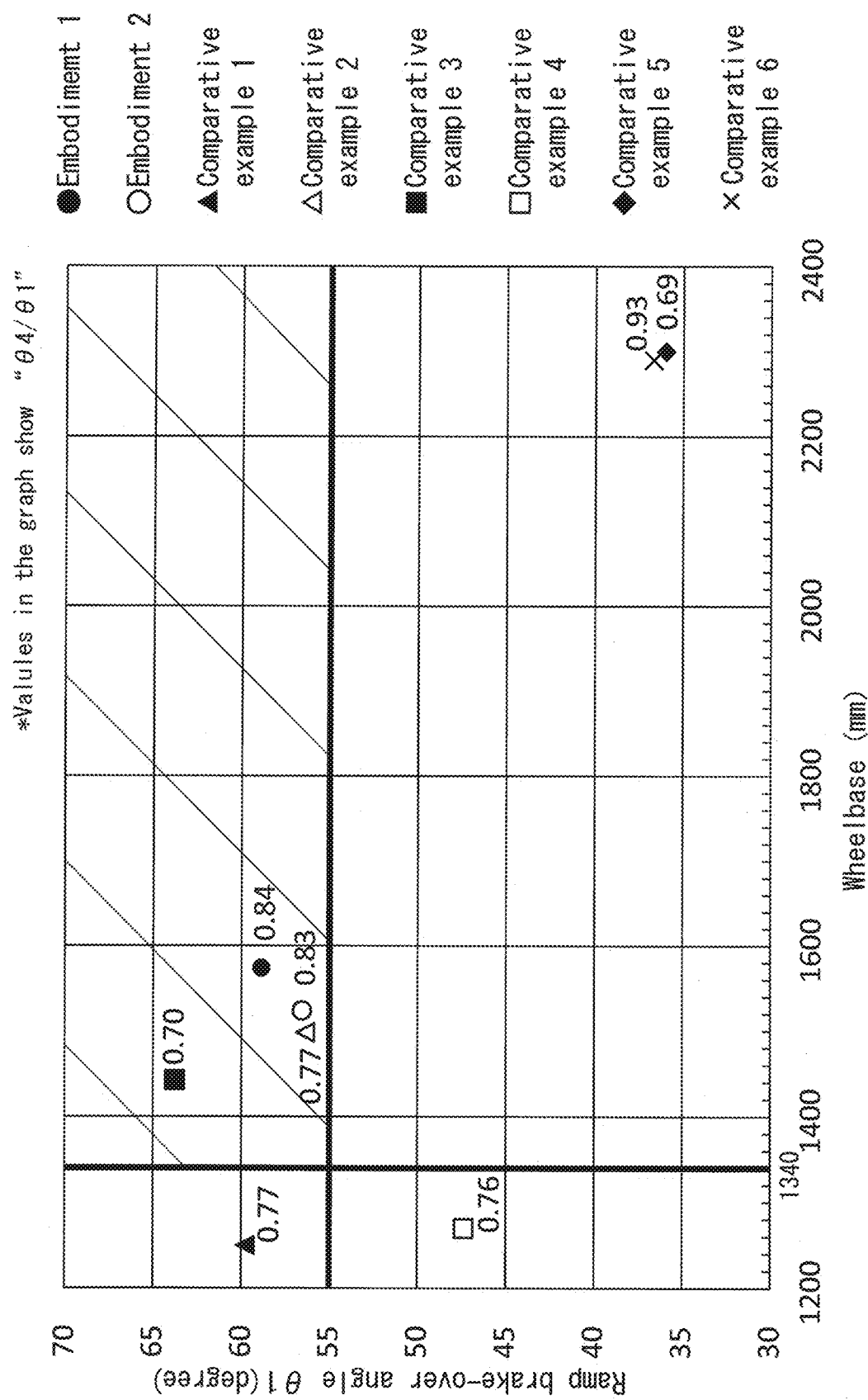
FIG. 12 is a graph which shows the wheelbase, the ramp brake-over angle θ1, and θ4/θ1 according to preferred embodiments of the present invention and comparative examples.

Referring to FIG. 9 and FIG. 12, preferably, the wheelbase of the vehicle 10 is not smaller than about 1340 mm, the angle θ1 is not smaller than about 55 degrees, and a ratio of the angle θ4 to the angle θ1 (θ4/θ1) is not smaller than about 0.8.

Figure 13:
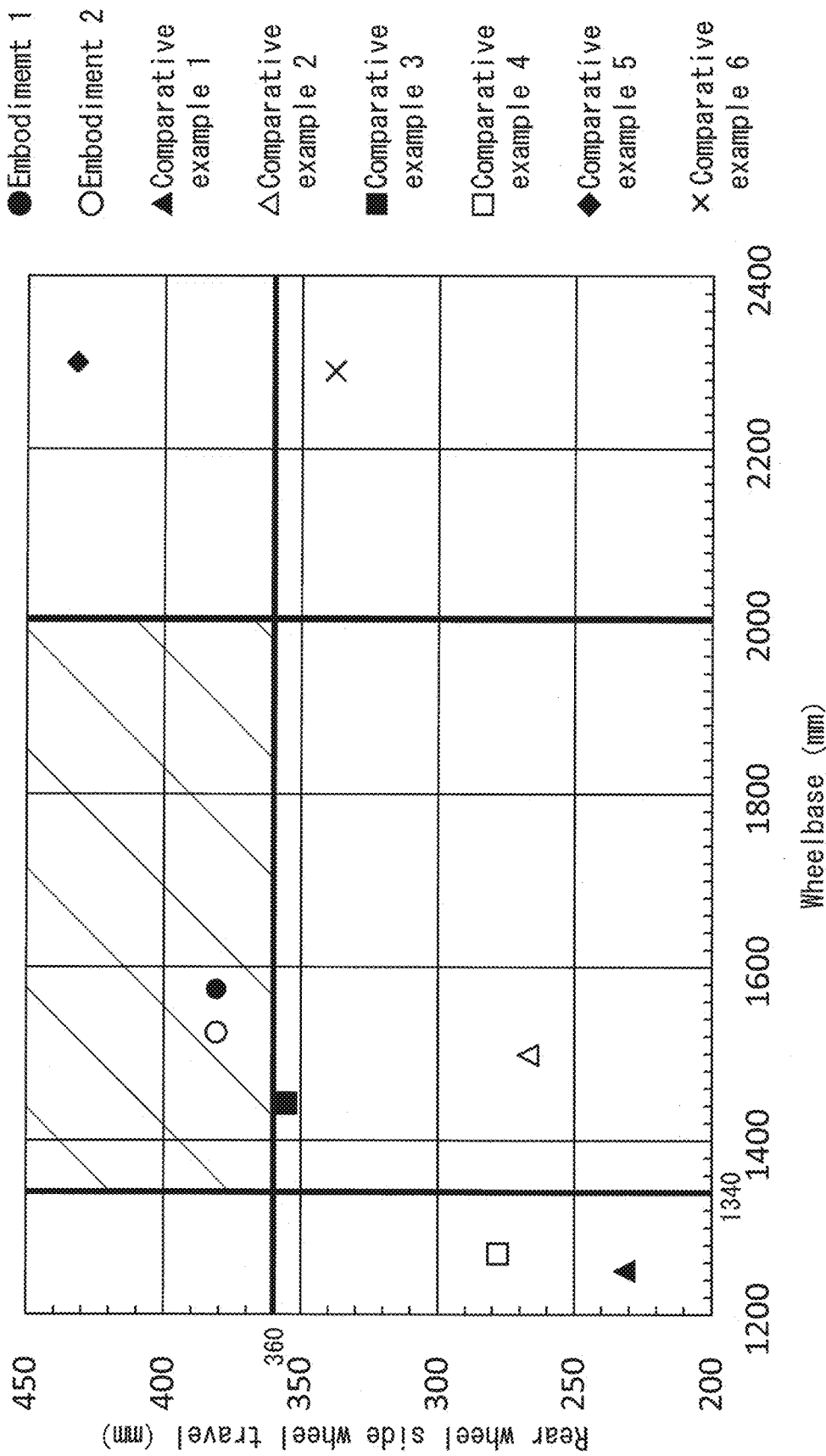
FIG. 13 is a graph which shows the wheelbase and the wheel travel on a rear wheel side according to preferred embodiments of the present invention and comparative examples.

Referring to FIG. 9 and FIG. 13, preferably, the wheelbase of the vehicle 10 is not smaller than about 1340 mm and not greater than about 2000 mm, and the wheel travel on the rear wheel 16 side (RE+RC) is not smaller than about 360 mm. Further, preferably, the wheel travel on the front wheel 16 side (FE+FC) is not smaller than about 270 mm.

Figure 14:
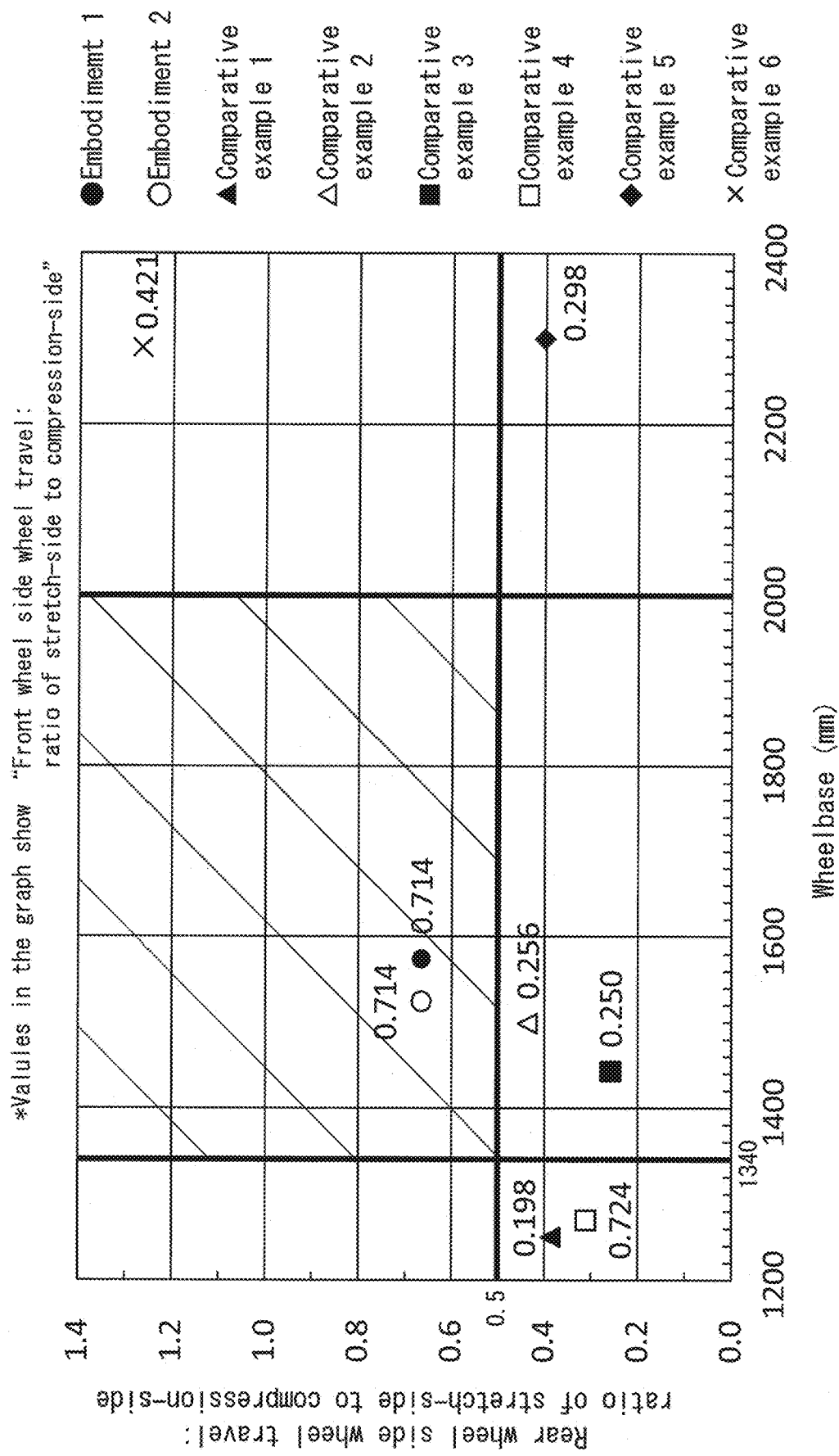
FIG. 14 is a graph which shows the wheelbase and a ratio of the wheel travel on a stretch-side to that of a compression-side according to preferred embodiments of the present invention and comparative examples.

Referring to FIG. 9 and FIG. 14, preferably, the wheelbase of the vehicle 10 is not smaller than about 1340 mm and not greater than about 2000 mm; the rear wheel 16 side wheel travel ratio of a stretch-side to a compression-side (stretch-side/compression-side: RE/RC) is not smaller than about 0.5; and further, preferably, the front wheel 14 side wheel travel ratio of the stretch-side to the compression-side (stretch-side/compression-side: FE/FC) is not smaller than about 0.5.

Figure 15:
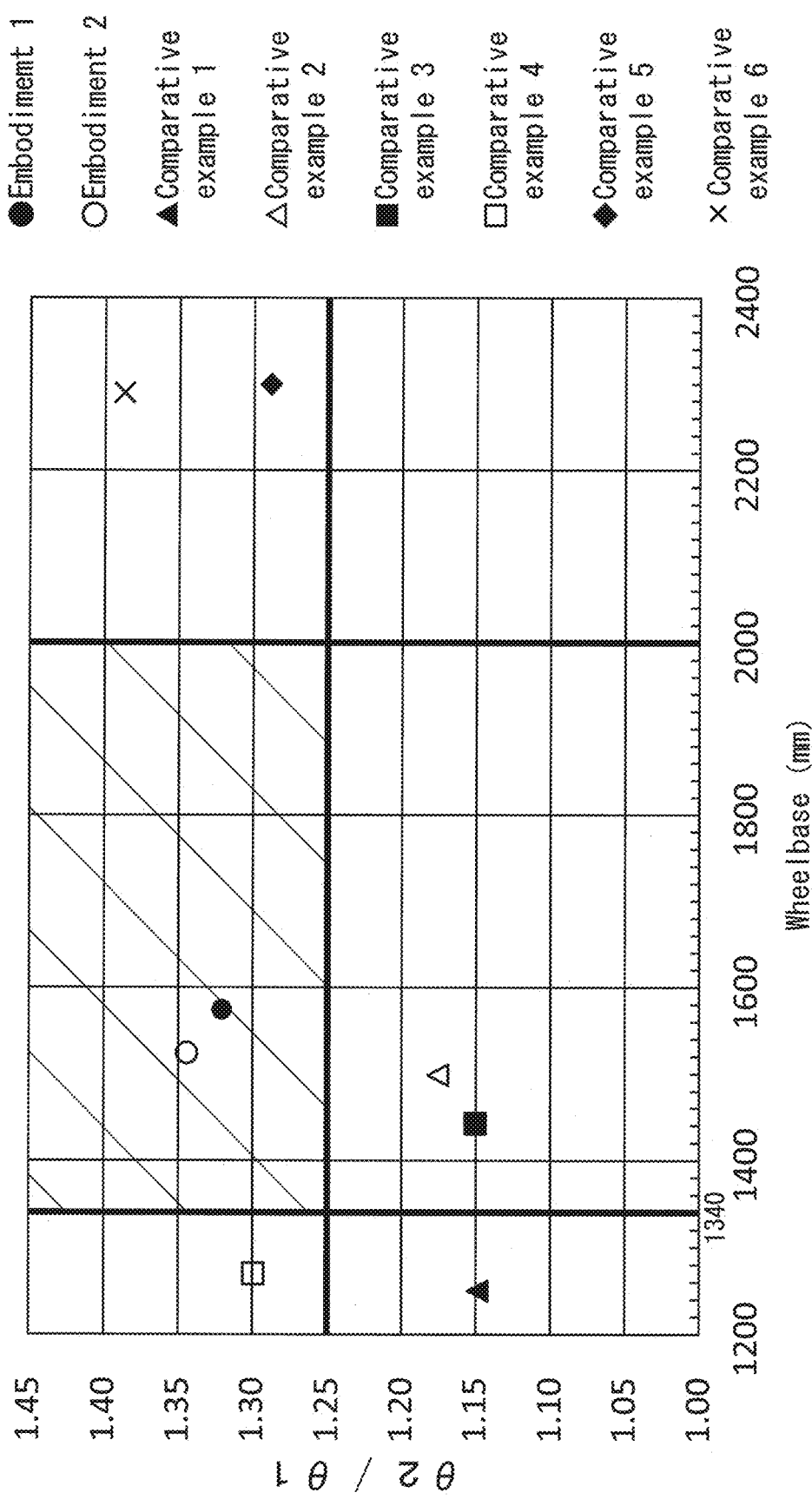
FIG. 15 is a graph which shows the wheelbase and θ2/θ1 according to preferred embodiments of the present invention and comparative examples.

Referring to FIG. 9 and FIG. 15, preferably, the wheelbase of the vehicle 10 is not smaller than about 1340 mm and not greater than about 2000 mm, and a ratio of the angle θ2 to the angle θ1 (θ2/θ1) is not smaller than about 1.25.

Further preferably, the minimum ground clearance H of the vehicle 10 is not smaller than about 275 mm, and the front tires 14b and the rear tires 16b (front wheels 14 and rear wheels 16) have an outer diameter not smaller than about 30 inches.

According to the vehicle 10 as described above, when traveling uphill on a steep slope or traveling over a large bump for example, there is a load shift toward the rear wheel 16 side, so the rear wheel 16 side second suspensions 24 sink and the front wheel 14 side first suspensions 22 stretch. During downhill travel, on the other hand, there is a load shift toward the front wheel 14 side, so the front wheel 14 side first suspensions 22 sink and the rear wheel 16 side second suspensions 24 stretch. In the vehicle 10, even if the wheelbase is long, the ramp brake-over angle θ1 is made greater such that the minimum ground clearance H is increased accordingly and there is less likelihood for rubbing the ground with the bottom of the vehicle. Also, increasing the wheel travel offers the same advantage.

More specifically, the following functions and advantages are obtained:

By making the wheelbase not smaller than about 1340 mm, the angle θ1 not smaller than about 55 degrees, and the θ2 to θ1 ratio (θ2/θ1) not smaller than about 1.25, even if the vehicle 10 has a long wheelbase, it becomes possible to increase the ramp brake-over angle θ1. Further, it becomes possible to increase the front wheel 14 stretch-side wheel travel FE and the rear wheel 16 stretch-side wheel travel RE. Thus, the minimum ground clearance H is increased, making it less likely to rub the ground with the bottom of the vehicle regardless of road conditions (flat, uphill or downhill).

By making the wheelbase not smaller than about 1340 mm, the angle θ1 not smaller than about 55 degrees, and the θ3 to θ1 ratio (θ3/θ1) not smaller than about 0.9, even if the vehicle 10 has a long wheelbase, it becomes possible to increase the ramp brake-over angle θ1. Further, it becomes possible to increase the angle θ3 to a value not significantly different from the ramp brake-over angle θ1. Therefore, it becomes less likely to rub the ground with the bottom of the vehicle especially in downhill situations.

By making the wheelbase not smaller than about 1340 mm, the angle θ1 not smaller than about 55 degrees, and the θ4 to θ1 ratio (θ4/θ1) not smaller than about 0.8, even if the vehicle 10 has a long wheelbase, it becomes possible to increase the ramp brake-over angle θ1. Further, it becomes possible to increase the angle θ4 to a value not significantly different from the ramp brake-over angle θ1. Therefore, it becomes less likely to rub the ground with the bottom of the vehicle especially in uphill situations.

By making the wheelbase not smaller than about 1340 mm and not greater than about 2000, and rear wheel 16 side wheel travel (RE+RC) to a value not smaller than about 360 mm, it becomes possible to increase the rear wheel 16 side wheel travel (RE+RC) in the vehicle 10 whose wheelbase is longer than typical ATV but shorter than those of the ROVs (Recreational Off-Highway Vehicles). This arrangement makes it less likely to rub the ground with the bottom of the vehicle especially in uphill travel situations.

By making the wheelbase not smaller than about 1340 mm and not greater than about 2000, and rear wheel 16 side wheel travel ratio of the stretch-side to the compression-side (stretch-side/compression-side: RE/RC) to a value not smaller than about 0.5, it becomes possible to relatively increase the rear wheel 16 stretch-side wheel travel RE in the vehicle 10 whose wheelbase is longer than typical ATVs but shorter than those of the ROVs. This arrangement makes it less likely to rub the ground with the bottom of the vehicle especially in downhill travel situations. Further, by making the front wheel 14 side wheel travel ratio of the stretch-side to the compression-side (stretch-side/compression-side: FE/FC) not smaller than about 0.5, it becomes possible to relatively increase also the front wheel 14 stretch-side wheel travel FE. This arrangement makes it less likely to rub the ground with the bottom of the vehicle especially in uphill situations.

By making the wheelbase not smaller than about 1340 mm and not greater than about 2000 mm; and the $\theta 2$ to $\theta 1$ ratio ($\theta 2/\theta 1$) not smaller than about 1.25, it becomes possible to increase the front wheel 14 stretch-side wheel travel FE and the rear wheel 16 stretch-side wheel travel RE in the vehicle 10 whose wheelbase is longer than typical ATV but shorter than those of the ROVs. Therefore, it becomes less likely to rub the ground with the bottom of the vehicle regardless of road conditions (flat, uphill or downhill).

By making the minimum ground clearance H not smaller than about 275 mm, even the vehicle 10 which has a long wheelbase becomes less likely to rub the ground with the bottom of the vehicle regardless of road conditions (flat, uphill or downhill).

Preferred embodiments of the present invention are suitably applied to the vehicle 10 which is a four-wheel off-road vehicle including the bar handle 18 and/or the saddle-style seat 20.

In the preferred embodiment of the present invention described above, description was made for a case where the vehicle 10 includes the pair of front wheels 14 and the pair of rear wheels 16. However, preferred embodiment of the present invention are not limited to this. The present invention is applicable to vehicles which include a front and a rear wheel, including a plurality of at least one of the front and rear wheels, and also applicable to tricycles too.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
    a body;
    a front wheel and a rear wheel;
    a first suspension between the body and the front wheel; and
    a second suspension between the body and the rear wheel; wherein
    when an angle $\theta 1$ represents a ramp brake-over angle, an angle $\theta 2$ represents an angle in an up-down direction defined by a tangential line extending through a bottom portion of the body at a center of a wheelbase to the front wheel and a tangential line extending through the bottom portion of the body at the center of the wheelbase to the rear wheel when the first suspension and the second suspension are fully stretched, and the wheelbase is not smaller than 1340 mm:
    the angle $\theta 1$ is not smaller than 55 degrees; and
    a ratio of the angle $\theta 2$ to the angle $\theta 1$ ($\theta 2/\theta 1$) is not smaller than 1.25.

2. The vehicle according to claim 1, further comprising a bar handle on the body.

3. The vehicle according to claim 1, further comprising a saddle-type seat provided on the body.

4. The vehicle according to claim 1, wherein at least one of the front wheel and the rear wheel includes a plurality thereof.

5. The vehicle according to claim 1, wherein the vehicle has a minimum ground clearance not smaller than 275 mm.

6. A vehicle comprising:
    a body;
    a front wheel and a rear wheel;
    a first suspension between the body and the front wheel; and
    a second suspension between the body and the rear wheel; wherein
    when an angle $\theta 1$ represents a ramp brake-over angle, an angle $\theta 3$ represents an angle in an up-down direction defined by a tangential line extending through a bottom portion of the body at a center of a wheelbase to the front wheel and a tangential line extending through the bottom portion of the body at the center of the wheelbase to the rear wheel when the first suspension is fully compressed and the second suspension is fully stretched, and the wheelbase is not smaller than 1340 mm:
    the angle $\theta 1$ is not smaller than 55 degrees; and
    a ratio of the angle $\theta 3$ to the angle $\theta 1$ ($\theta 3/\theta 1$) is not smaller than 0.9.

7. A vehicle comprising:
    a body;
    a front wheel and a rear wheel;
    a first suspension between the body and the front wheel; and
    a second suspension between the body and the rear wheel; wherein
    when an angle $\theta 1$ represents a ramp brake-over angle, an angle $\theta 4$ represents an angle in an up-down direction defined by a tangential line extending through a bottom portion of the body at a center of a wheelbase to the front wheel and a tangential line extending through the bottom portion of the body at the center of the wheelbase to the rear wheel when the first suspension is fully stretched and the second suspension is fully compressed, and the wheelbase is not smaller than 1340 mm:
    the angle $\theta 1$ is not smaller than 55 degrees; and
    a ratio of the angle $\theta 4$ to the angle $\theta 1$ ($\theta 4/\theta 1$) is not smaller than 0.8.

8. A vehicle comprising:
    a body;
    a front wheel and a rear wheel;
    a first suspension between the body and the front wheel; and
    a second suspension between the body and the rear wheel; wherein
    when the vehicle has a wheelbase not smaller than 1340 mm and not greater than 2000 mm:
    a wheel travel on a rear wheel side is not smaller than 360 mm.

9. A vehicle comprising:
    a body;
    a front wheel and a rear wheel;
    a first suspension between the body and the front wheel; and
    a second suspension between the body and the rear wheel; wherein when the vehicle has a wheelbase not smaller than 1340 mm and not greater than 2000 mm:
a wheel travel ratio of a stretch-side to a compression-side (stretch-side/compression-side) on a rear wheel side is not smaller than 0.5.

10. The vehicle according to claim 9, wherein the vehicle has a wheel travel ratio of a stretch-side to a compression-side (stretch-side/compression-side) on a front wheel side not smaller than 0.5.

11. A vehicle comprising:
a body;
a front wheel and a rear wheel;
a first suspension between the body and the front wheel; and
a second suspension between the body and the rear wheel;
wherein
when an angle $\theta 1$ represents a ramp brake-over angle, an angle $\theta 2$ represents an angle in an up-down direction defined by a tangential line extending through a bottom portion of the body at a center of a wheelbase to the front wheel and a tangential line extending through the bottom portion of the body at the center of the wheelbase to the rear wheel when the first suspension and the second suspension are fully stretched, and the wheelbase is not smaller than 1340 mm and not greater than 2000 mm:
a ratio of the angle $\theta 2$ to the angle $\theta 1$ ($\theta 2/\theta 1$) is not smaller than 1.25.

\* \* \* \* \*